United States Patent [19]

Toyosawa

[11] 3,939,455

[45] Feb. 17, 1976

[54] MICROPROCESSOR HAVING AN INTERFACE FOR CONNECTION OF EXTERNAL DEVICES

[75] Inventor: Koki Toyosawa, Yokohama, Japan

[73] Assignee: Hitachi, Ltd., Japan

[22] Filed: Sept. 10, 1974

[21] Appl. No.: 504,703

Related U.S. Application Data

[63] Continuation of Ser. No. 293,051, Sept. 28, 1972, abandoned.

[30] Foreign Application Priority Data

Oct. 1, 1971   Japan.............................. 46-76311

[52] U.S. Cl. ........................................... 340/172.5
[51] Int. Cl.² .......................................... G06F 9/00
[58] Field of Search ................................ 340/172.5

[56] References Cited
UNITED STATES PATENTS

| | | | |
|---|---|---|---|
| 3,274,561 | 9/1966 | Hallman et al. ................ | 340/172.5 |
| 3,325,788 | 6/1967 | Hackl ............................. | 340/172.5 |
| 3,421,150 | 1/1969 | Quosig et al. .................. | 340/172.5 |
| 3,673,575 | 6/1972 | Burton et al. .................. | 340/172.5 |
| 3,681,761 | 8/1972 | Schrenemann et al. ......... | 340/172.5 |
| 3,704,448 | 11/1972 | Osborne ....................... | 340/172.5 |
| 3,725,868 | 3/1973 | Malmer, Jr. et al. ............ | 340/172.5 |

*Primary Examiner*—Harvey E. Springborn
*Assistant Examiner*—Paul R. Woods
*Attorney, Agent, or Firm*—Craig & Antonelli

[57] ABSTRACT

A program-controlled microprocessor of the microprogramming type adapted to be incorporated in a system including external circuit devices. The microprocessor is provided with an interface arrangement for connecting the microprocessor to the external circuit device wherein the interface arrangement includes data buses which are an extension of at least a portion of the data buses of the arithmetic section in the microprocessor. The interface arrangement also includes a control bus arrangement adapted to provide outputs relating to the contents in a read-only-memory register for microprogramming and an address bus arrangement which is adapted, when the external circuit device receives a microprocessing instruction through the control bus arrangement, to provide the external circuit device connected thereto with means for designating an address of the next micro-programming instruction to be executed.

1 Claim, 11 Drawing Figures

TYPE 0

| 0 1 | 2 3 4 | 5 6 7 | 8 9 10 | 11 12 13 | 14 15 |
|---|---|---|---|---|---|
| 2 | 3 | 3 | 3 | 3 | 2 |
| TYPE | FUNCTION | SOURCE REGISTER | DESTINATION REGISTER | CONTROL | RELATIVE JUMP ADDRESS |

TYPE 1

| 0 | | 7 | 8 | | 15 |
|---|---|---|---|---|---|
| 2 | 3 | 3 | 3 | 5 | |

SAME AS TYPE-0 (bits 0–10), BRANCH FACTOR (bits 11–15)

TYPE 2

| 0 | | 7 | 8 | | 15 |
|---|---|---|---|---|---|
| 2 | 3 | 3 | 3 | 5 | |

SAME AS TYPE-0 (bits 0–10), RELATIVE JUMP ADDRESS (bits 11–15)

TYPE 3

| 0 | | 7 | 8 | | 15 |
|---|---|---|---|---|---|
| 2 | 3 | 3 | 3 | 5 |

TYPE, FUNCTION, REGISTER, EXTERNAL DEVICE NO., OP CODE FOR EXTERNAL DEVICE

MEMORY REFERENCE INSTRUCTION

CONTROL INSTRUCTION

I/O INSTRUCTION

FIG. 6

1. THE MEMORY IS ENERGIZED WITH INFORMATION STORED IN COUNTER P AS AN ADDRESS.
2. WHEN A BRANCH IS MADE INTO A 1-BYTE INSTRUCTION, THE OTHER OPERATIONS THAN THIS MICROPROGRAMMING INSTRUCTION ARE DAMPED.
3. NO ADDRESS IS DESIGNATED BUT INFORMATION STORED IN AR IS USED AS AN ADDRESS.

MICROPROCESSOR HAVING AN INTERFACE FOR CONNECTION OF EXTERNAL DEVICES

This is a continuation of application Ser. No. 293,051, filed Sept. 28, 1972 now abandoned.

BACKGROUND OF THE INVENTION

1. Field of the Invention

This invention relates to a microprocessor.

2. Description of the Prior Art

The use of a relatively small computer called "minicomputer" has been extended widely in recent years, mainly because of the advantage of incorporating the minicomputer into a system or device as one of its elements. The extension of the use of the minicomputer has been accelarated by its low cost. Another reason for this rapid spread of the minicomputer use is its applicability to general purposes which permit its utilization as a control element of a wide variety of relatively complicated systems each produced only in a small quantity. In other words, the minicomputer can be used more effectively, the more complicated the functions of the control element with which it is used. The present trend toward further extension of this type of computer demands a lower cost thereof, which in turn is leading to the advent of a microprocessor lower in grade than the minicomputer.

The microprocessor is intended to be incorporated in a device and it is not practical to be employed independently. It is necessary that the microprocessor, when incorporated in a device, provides a sufficiently superior matching with the other components of the device so that it competes well with a conventional control element. Therefore, the requirements of the microprocessor are the low cost and high flexibility or adaptability to other various component elements, which are contradictory to each other.

In an ordinary microprocessor, one word processesd therein consists of 8 to 12 bits and has a core memory of only 8K (8000) words or less. Such a microprocessor is used mainly as a programmable sequence control circuit for terminal equipment, automatic testing apparatus and sequence control device. The conventional microprocessors have no significant characteristics but have been constructed with the art similar to the one used for the minicomputers.

SUMMARY OF THE INVENTION

An object of the present invention is to provide a low-cost, flexible microprocessor, or more in particular to provide a microprocessor which provides a good matching with the other component elements of a device thereby to contribute to an integral arrangement of the component elements of the device.

Another object of the present invention is to provide a program-controlled microprocessor adapted to be incorporated in a system or device, comprising a plurality of interface bus bars including at least a data bus, control bus and address bus by which said microprocessor is connected with the other circuits of the system or device and to which a plurality of external circuits are adapted to be connected in parallel, said data bus being an extension of the whole or part of the data bus of the data flow section in the microprocessor, said control bus producing an output which is a modification in whole or part of the information stored in a fixed-memory register for microprogramming, said address bus providing means through which the external circuit designates an address for microprogramming instructions to be executed next to certain other microprogramming instructions.

DESCRIPTION OF THE PREFERRED EMBODIMENTS

Figure 1:
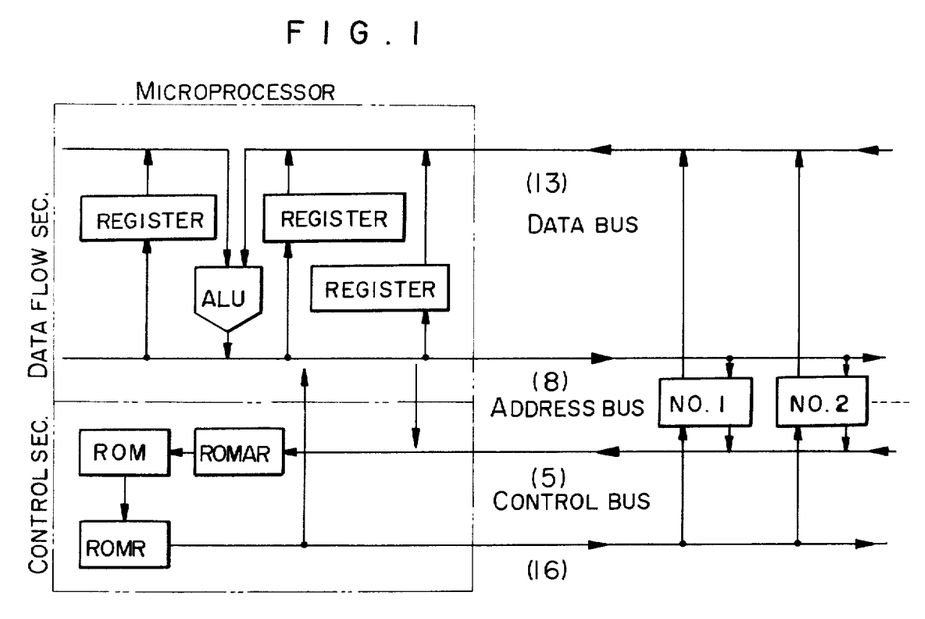
FIG. 1 is a diagram showing the interface between the microprocessor and external device.

The interface between the microprocessor and other devices is shown in FIG. 1. This interface greatly difers from the conventional I/O channel in that in the present interface a part of the microprocessor is open to an external device so that the external device may operate as a part of the microprocessor.

The data flow for the microprocessor is by means of bus bars through which data flows from one register to another. An 8-bit data bus extends from the microprocessor for connection with the external device, while a total of 13 data buses enter the microprocessor from the external device.

Another group of signal lines in the interface is concerned with control operations and is called a control bus. The control bus is the result of taking out 16 lines from the memory register (ROMR) of a control memory for the microprocessor, i.e. a fixed memory (ROM) which houses a microprogram. These signal lines are used also for control in the microprocessor after application through an appropriate decoder.

There is the third group of signal lines in the interface which is called an address bus and led from an external device into the microprocessor. The address bus which consists of five signal lines is provided for the purpose of permitting an external device to designate an address of the next microprogramming instruction to be executed when a certain microprogramming instruction is issued.

In addition to the buses mentioned above, the interface contains other several special signal lines for mutual communication of information on the status of the microprocessor and external device.

Figure 2:
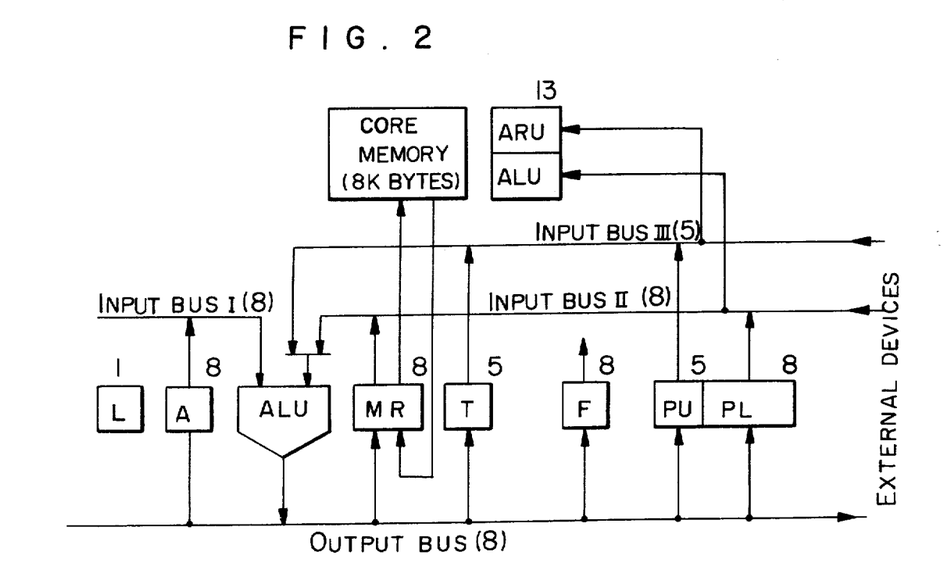
FIG. 2 shows a data flow of the microprocessor.

The data flow in the microprocessor is shown in FIG. 2. The input bus I is for connecting the register A with the arithmetic unit (ALU) and consists of eight lines. The input bus II which also consists of eight signal lines connects the memory register (MR), function register (F) and the low order section (PL) of the program counter thereby to lead them to one of the entrances of the arithmetic unit (ALU). The input bus III connects the register T and the high-order section (PU) of the program counter, so as to join the input bus II in an OR mode at the entrance of ALU. These input buses II and III are taken out to make up input data buses for the interface. The output bus is provided for the purpose of distributing data among the registers in response to a signal from ALU and is also taken out to make up an output data bus for the interface. The core memory has the depth of one byte, i.e. a number of bits corresponding to one byte, and is connected with the memory register MR.

The functions of each register performed in the data flow are as described below.

Register A (8 bits): arithmetic register

MR (8 bits): memory register

T (5 bits): temporary register in which a section of an indirect address designating the page is temporarily stored.

F (8 bits): function register or instruction register

P (13 bits): program counter comprising the two portions PU and PL for designating the page and an address within the page respectively.

AR (13 bits): memory address register

L (1 bit) : LINK flip-flop which is set or reset depending on whether the carry of the most significant digit occurs or not when carrying out an add instruction. LINK and register A are shifted round in combination according to a shift instruction.

With reference to the above-described data flow, a few examples of operation will be explained below.

Operation 1 "Add to register A the information stored in the designated address of the core memory."

The address of the core memory is given to the memory address register AR, whereupon the information stored in the designated address is produced in the memory register MR. It takes only one machine cycle or less until the memory register MR produces an output after the energization of the core memory. During the next machine cycle, register A and memory register MR send data onto the input buses I and II respectively, followed by an add operation in the arithmetic circuit ALU, and the result thereof is sent into register A through the output bus.

Operation 2 "Read out the information stored in the core memory designated by an external device and transfer it to that external device."

The address information from the external device is given through the input buses II and III and at the same time the core memory is energized. During the next machine cycle, the information applied to the memory register MR from the memory is delivered to the external device through the input bus II, arithmetic circuit ALU and the output bus.

Explanation will be made now of how the route of the above-mentioned data transfer is established as a control operation.

Figure 3:
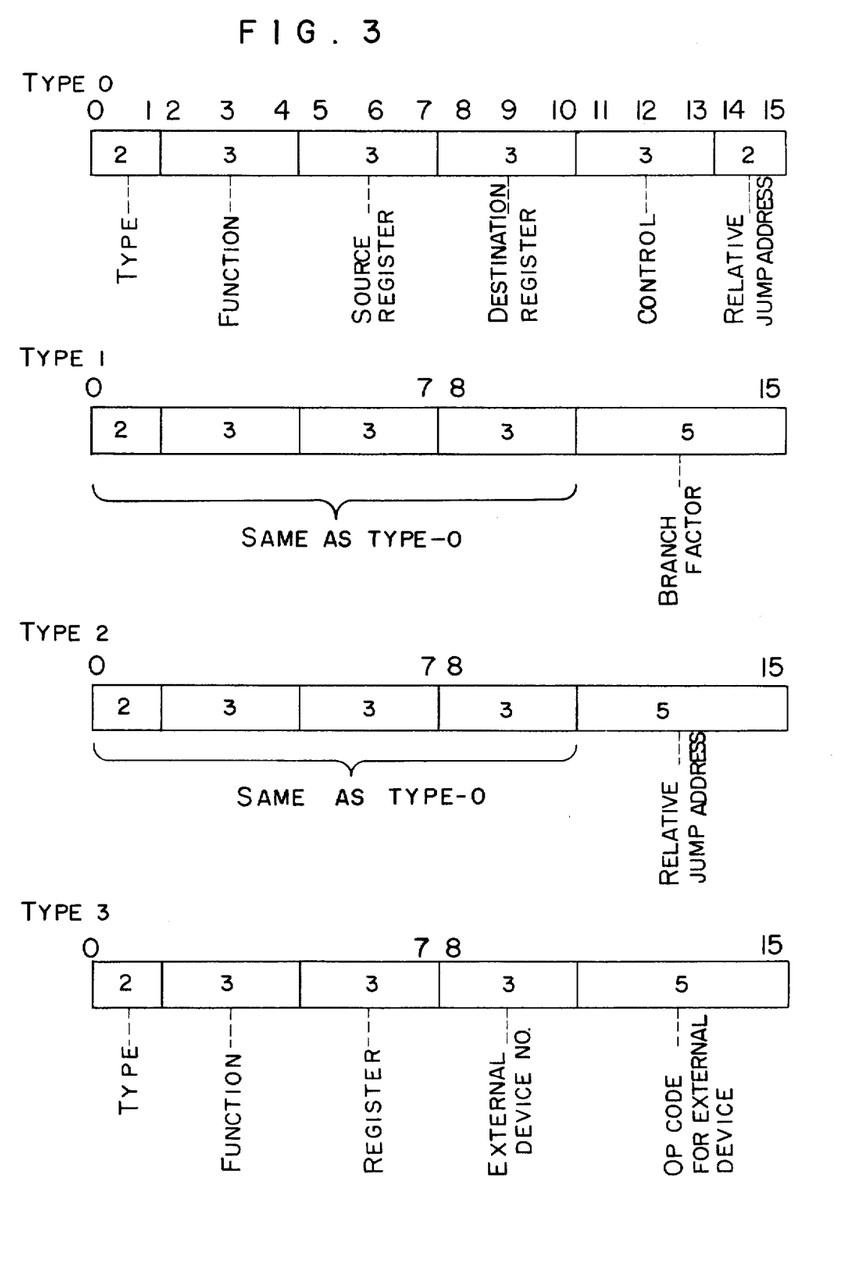
FIG. 3 shows formats of the microprogramming instructions.

The microprocessor according to the present invention employs what is called microprogramming control system with a microprogram contained in a read-only-memory (ROM) of 16-bit depth. This read-only-memory has the cycle time of 1.08 μs and access time of 0.7 μs, the former agreeing with a one machine cycle. As shown in FIG. 3, the microprogramming instructions are divided into four types O, 1, 2 and 3. Types 0, 1 and 2 are used for the controlling of the operation of the microprocessor itself, and type 3 for the controlling of data communication between the microprocessor proper and the external device as well as the operation of the external device. These types are classified by the two bits 0 and 1 of the microprogramming instructions.

Each field of the types 0, 1 and 2 of microprogramming instructions will be now explained. Bits 2 to 4 show the functions of the microprogramming instructions and play a role similar to the one of the operation section of the instructions. Bits 5 to 7 are for the designation of a source register in the operations using the data bus, while bits 8 to 10 designate another source register and a destination register for containing the operation results. For certain functions, however, the field of the source register is used to indicate a variation of the functions.

The functions of bits 11 to 15 differ according to the type of microprogramming instructions, type 0 designating the control function of the high three bits 11 to 13. The control function does not use the data bus and therefore permits simultaneous operation with the bus operation. The last two bits 14 and 15 of the microprogramming instructions are provided for designating the next microprogramming instruction to be executed and divided into the four types as described in Table 1.

Table 1

| Bit 14 | Bit 15 | Instructions |
|--------|--------|--------------|
| 0 | 0 | jump to the first microprogramming instruction of the instruction fetch cycle |
| 0 | 1 | microprogramming instruction of next address |
| 1 | 0 | microprogramming instruction two addresses ahead |
| 1 | 1 | microprogramming instruction three addresses ahead |

In type 1 of the microprogramming instructions, bits 11 to 15 determine whether or not the next microprogramming instruction is to be skipped depending upon the internal condition of the microprocessor or the operating results. For this purpose, this field is capable of a maximum of 32 different skip operations. An example of such operations will be illustrated below.

When carry is made after the addition of one byte, this condition is stored in the LINK flip-flop. But if the next microprogramming instruction is detected in the LINK flip-flop by means of type 1, this microprogramming instruction effects a skip operation so that a carry is made to a higher byte in the following steps. In other words, this type of microprogramming instruction is necessary to change the sequence of microprogram according to the operating results and other internal conditions of the microprocessor, and thereby to take appropriate action suitable to the situation.

Out of the 32 skip conditions, three are unique and are capable of being distributed as required regardless of the internal conditions. They will be explained in detail later with reference to the microprogram for each instruction.

Bits 11 and 15 of type 2 are for designating the next microprogramming instruction, i.e. a relative address with respect to the address of the read-only-memory. In other words, bit 11 is a code of a relative address, and when it is 1, it indicates a negative number, thus jumping to a lower address. When bit 11 is zero, by contrast, a positive relative address is indicated with the result that a jump is made to a higher address. The distance covered by the jump is determined by the four bits 12 to 15, which may range from 0 to 15.

Type 3 is the same as the other types in format but greatly different from them in the function of each field. Bits 2 to 7 of type 3 represent the functions concerning the bus operation of the microprocessor which are different from those of types 0 to 2. Bits 8 to 15 are concerned with the operation of the external device. among them, bits 8 to 10 designate the number of the external device, and bits 11 to 15 the operations of the external device. These operations not only include the bus operation associated with the microprocessor and the operation of the external device but are based on the information for controlling the sequence of execution of the microprogram. The decoding of the information is left to the external device, so that the codes unique to the external device are allotted when it is connected with the microprocessor.

To explain what code should be allotted to each microprogramming instruction is to clarify the operation of microprogram control. Detailed explanation about the code allotment is omitted since it is rather well known and does not constitute the object of the present invention. Part of the information contained in the microprogramming instruction will become apparent from the microprogram flow chart concerning a few major functions which will be explained later.

Figure 4:
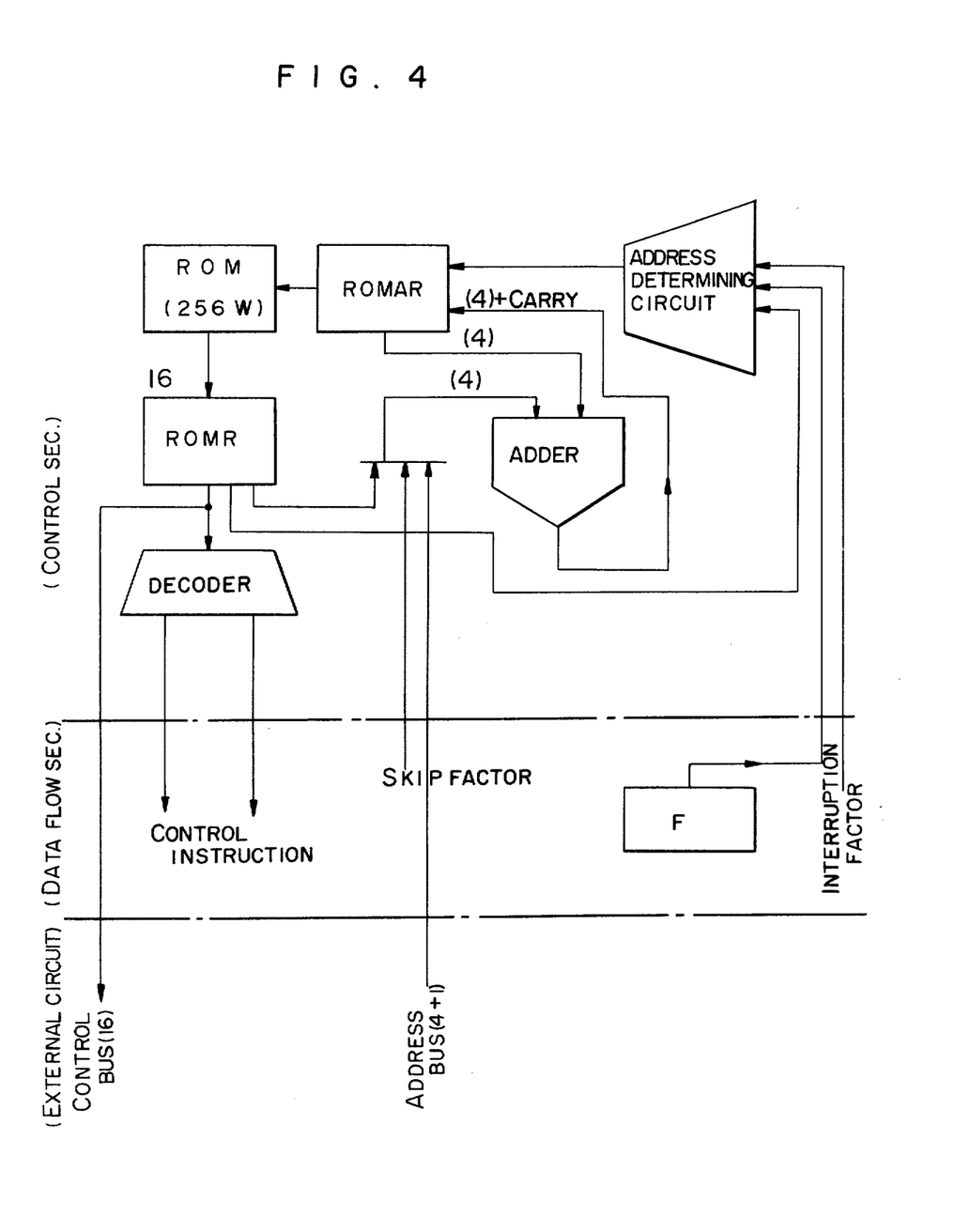
FIG. 4 is a diagram showing the sequence control section for microprogramming.

The information contained in the microprogramming instructions is roughly divided into the information for controlling the data flow section and the one for controlling the sequence of execution of the microprogram. A block diagram of a hardward for handling the latter is shown in FIG. 4. It will be noted from this figure that the sequence of microprogram is regulated by the read-only-memory address register ROMAR, and there are five routes for determining this order:

1. One is added on ROMAR as a normal route.
2. Two is added on ROMAR as a skip operation.
3. The number designated by the microprogramming instruction is added or subtracted on ROMAR.
4. The number designated by an external device is added or subtracted on ROMAR.
5. ROMAR is set at a specified address according to a given state occurred, for example, when a jump is made to an interruption sequence.

Figure 5:
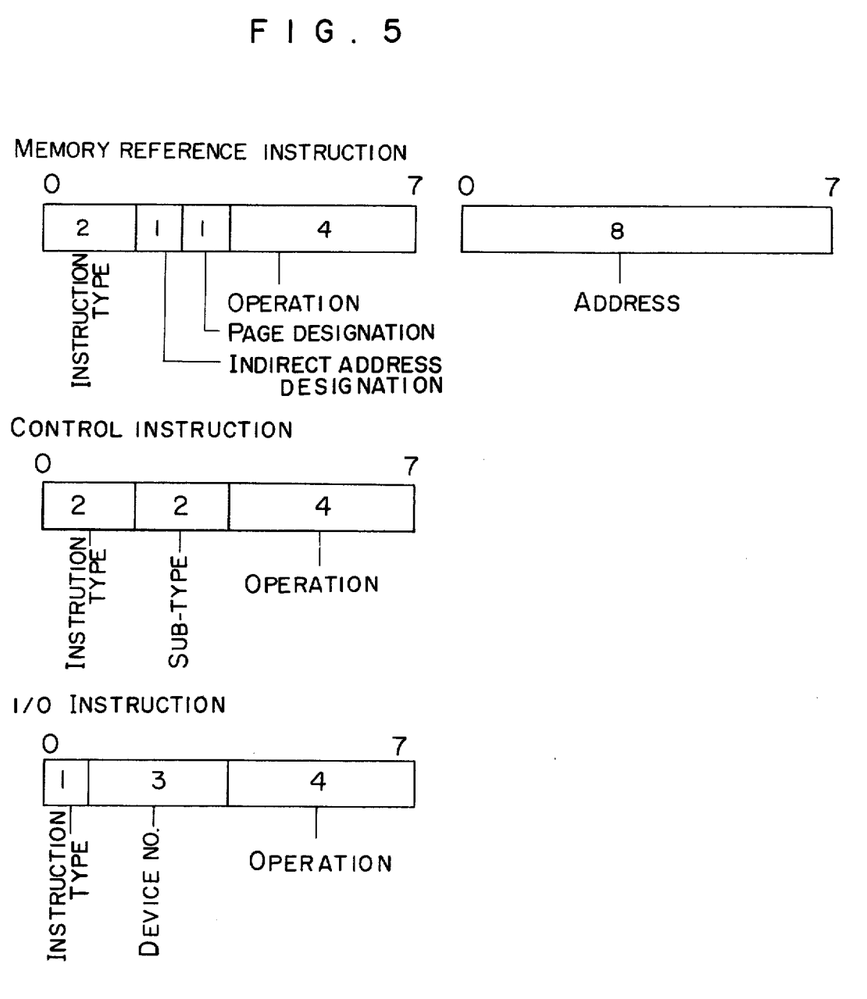
FIG. 5 is a diagram showing formats of instruction words.

The formats of the instruction word for the microprocessor are as shown in FIG. 5. Among these formats, the memory reference instruction is 2 bytes long, while all the other instructions include one byte. The functions of these instruction words are roughly described in Table 2. The detailed explanation of the functions of the instruction words is not necessarily needed for the description of the present invention, and the outline of the functions may be known from the naming of each instruction word. Therefore, no detailed explanation will be made here about their functions. At least the instruction words listed in Table 2 are required for the operation of the microprocessor only. If there are any other functions required, a microprogram is prepared in accordance with a newly added instruction code, whereby it is relatively easy to add a new instruction. This process is required especially when an external device is arranged to operate in combination with the microprocessor. The flexibility in adding an instruction is a great advantage of the microprogramming control system.

Table 2

| Item No. | Instruction Words | Basic Instructions for Microprocessor Functions | | Remarks |
|---|---|---|---|---|
| 1 | LOAD | (n) → A | (n): | Information stored in address n of memory |
| 2 | AND | (n).(A) → A | | |
| 3 | EXCLUSIVE OR | (n) + (A) → A | | |
| 4 | ADD | (n) + (A) → A | | |
| 5 | STORE | (A) → address n | | |
| 6 | INCREMENT & SKIP ON ZERO | (n) + 1 → address n  Skip if (n) + 1 = 0 | | |
| 7 | JUMP | n → PL | n: | Address value |
| 8 | LOAD IMMEDIATE | n → A | | |
| 9 | AND IMMEDIATE | n.(A)    A | | |
| 10 | EXOR IMMEDIATE | n ⊕ (A) → A | | |
| 11 | ADD IMMEDIATE | n + (A) → A | | |
| 12 | STOP | operation stopped | | |
| 13 | NO OPERATION | | | |
| 14 | CLEAR LINK | 0 → L | L: | LINK flip-flop |
| 15 | SET LINK | 1 → L | | |
| 16 | SKIP LINK | Skip if (L) = 1 | | |
| 17 | SKIP A-ZERO | Skip if (A) = 0 | | |
| 18 | SHIFT LEFT | Shift round left or right respectively register A and LINK | | |
| 19 | SHIFT RIGHT | | | |
| 20 | I/O START | Start I/O operation | | |
| 21 | I/O READ | Read I/O data | | |
| 22 | I/O WRITE | Write in I/O data | | |

Figure 6:
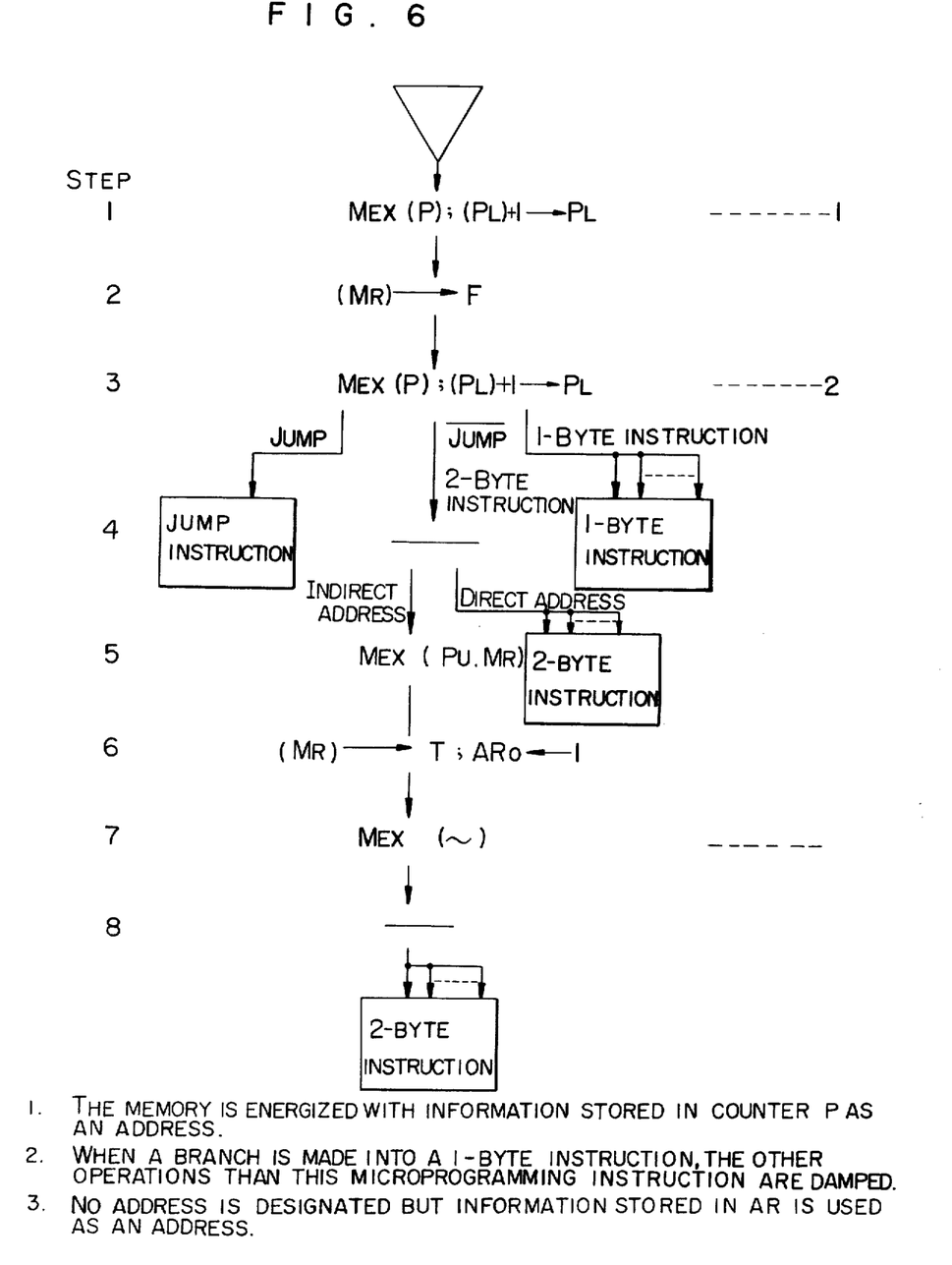
FIG. 6 is a microprogramming flow chart showing an instruction fetch cycle.

It is to be noted here, however, that in the conventional minicomputer new instructions concerning the inputs and outputs were provided with comparative ease by adding an external circuit, while on the other hand in the microprogramming system an instruction associated with the internal operation of the microprocessor can be generally achieved by changing the microprogram. Explanation will be made now of the mechanism of microprogramming control with reference to a few instructions on the operation processes of the microprocessor. The instruction processes are roughly divided into an instruction fetch cycle and an execution cycle. The former is common to all instructions, while the latter is different for different instructions. The fetch cycle will be explained first as an operation of the microgram routine which may be best represented with the aid of a microprogram flow chart as shown in FIG. 6. In this figure, each expression without any semicolon shows one function and those expressions with a semicolon a plurality of functions defined by the semicolon which can be performed simultaneously.

A route leading to the next microprogramming instruction is indicated by an arrow. Where there are more than one route to be followed, one of them is selected according to the condition marked beside the arrow. FIG. 6 is a flow chart showing an essential part of microprogramming in the instruction fetch cycle for the miicroprocessor. The omitted portion includes the step of page designation, which may be included in the chart without any special effect on the flow.

This microprogram flow chart will be explained below with reference to the data flow of FIG. 2.

Step 1: The memory is energized with P counter as an address. At the same time, +1 is added on (PL).

Step 2: Information or instruction word read out which is stored in register MR is transferred to register F.

Step 3: For a two-byte instruction, the memory is energized to read the second word of instruction. As noted in FIG. 6, neither the memory is energized nor addition made on P counter in the case of one-byte instruction. The route is branched for the selection of the next microprogramming instruction. Especially for a one-byte instruction, the route is branched at once into a routine corresponding to each instruction code. In the case of a two-byte instruction, the operations are different for JUMP and other instructions which are branched separately.

Step 4: In the case of JUMP instruction or one-byte instruction, the first microprogramming instruction of the execution cycle is executed. For two-byte instructions other than JUMP, indirect and direct addresses have different routes, the route for the latter being branched into a routine corresponding to an instruction code.

Step 5: The memory is energized by means of the address data on the second instruction word read out on the register MR.

Step 6: Page information out of the address information read out of the memory is transferred to register T. At the same time, +1 is added on register AR.

Step 7: The memory is energized. Information stored in register AR is used as an address without any designation by the register. The address within the page is produced from the memory.

Step 8: The route is branched into a routine corresponding to a two-byte instruction code.

Figure 7:
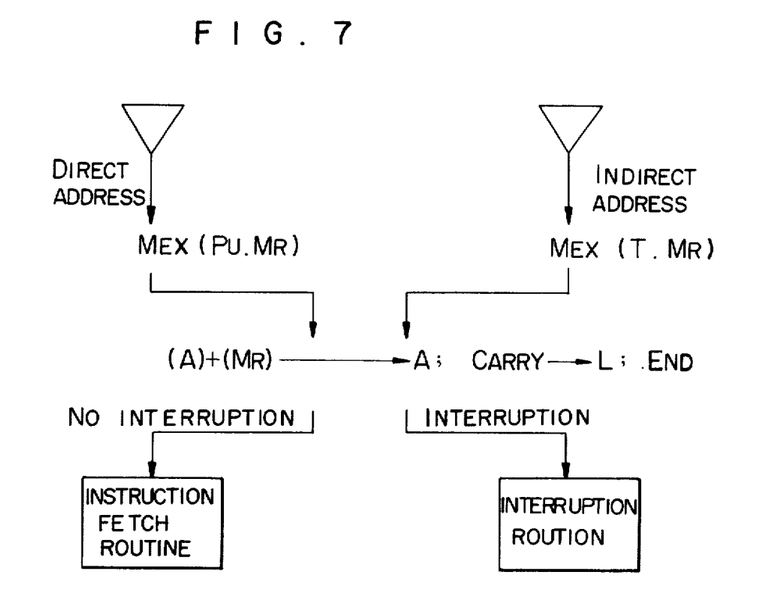
FIG. 7 is a flow chart showing the microprogramming of an ADD operation.

Explanation will be made now of the sequence after the fetch cycle with reference to an ADD instruction as a typical example in the execution cycle. A microprogram flow chart of the sequence is shown in FIG. 7. The point to which a jump is made in the execution cycle is somewhat different for direct and indirect addressing, in both cases of which a necessary operand taken out is added to the information stored in register A and the result is housed therein. When a carry is made from the highest order, the LINK flip-flop is set accordingly. When no carry is made, by contrast, LINK is reset. In this last-mentioned microprogramming instruction, a designation is necessary to the effect that the last stage of the execution cycle has been reached for various operations. This is followed by a fetch cycle of the next instruction or the interruption sequence which is not executed until the completion of an instruction in the presence of an interruption factor. An instruction is executed again after the interruption routine.

Explanation will be made now of the features of the present invention in connection with character display function utilizing a cathode-ray tube, as an example of the operations associated with an external device. An object of the present invention is to provide an integrated cathode-ray tube display unit by adding to the microprocessor minimum required circuits for the cathode-ray tube display.

In the conventional system, there was a disadvantage that the greater part of minicomputer time is consumed for refreshing of the display unless the external circuit is provided with a refreshing buffer memory, when a cathode-ray tube is added to the I/O channel for display. According to the present invention, however, the memory for the microprocessor is usable as a refreshing memory, eliminating the need for an independent external buffer memory. Also, the present invention is so arranged that the maximum processing ability of the microprocessor is achieved.

Figure 8:
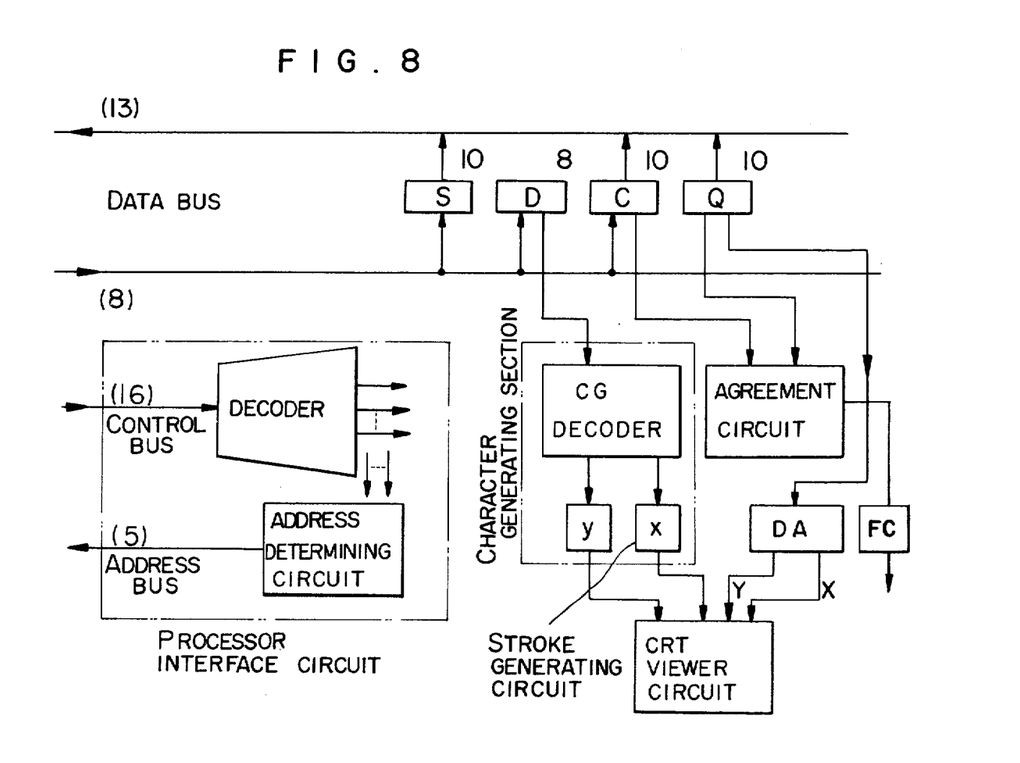
FIG. 8 is a block diagram showing the functions of a CRT display adaptor.

The block diagram of FIG. 8 shows the functions of the attachment for display. The following are the register functions associated with the data flow of the figure:

Q (10 bits) . . . . Character position counter holding 10 bits for indication of 1024 characters.

C (10 bits) . . . Cursor register for indication of cursor position.

D (8 bits) . . . Stroke data register for storing stroke data and delivering data to the character generator CG.

S (10 bits) . . . Stroke counter for designating the address of a stroke to be indicated on the character pattern memory with the ability of 1024 bytes.

All of these registers are connected not only to the data bus but the circuit of each register itself. An agreement circuit is provided for the purpose of comparison between counters C and Q for cursor indication and provides an output for setting the cursor flip-flop FC at an appropriate timing. The character generator is a circuit for generating a stroke of character element from the stroke data and also for effecting appropriate control by reading information indicating unblank of the Cathode-ray tube, character-end, or the like. The output of counter Q designates the character position on the CRT through a D-A converter circuit. In addition to these circuits, a processor-interface circuit is provided for interchange of control information with the microprocessor.

Figure 9:
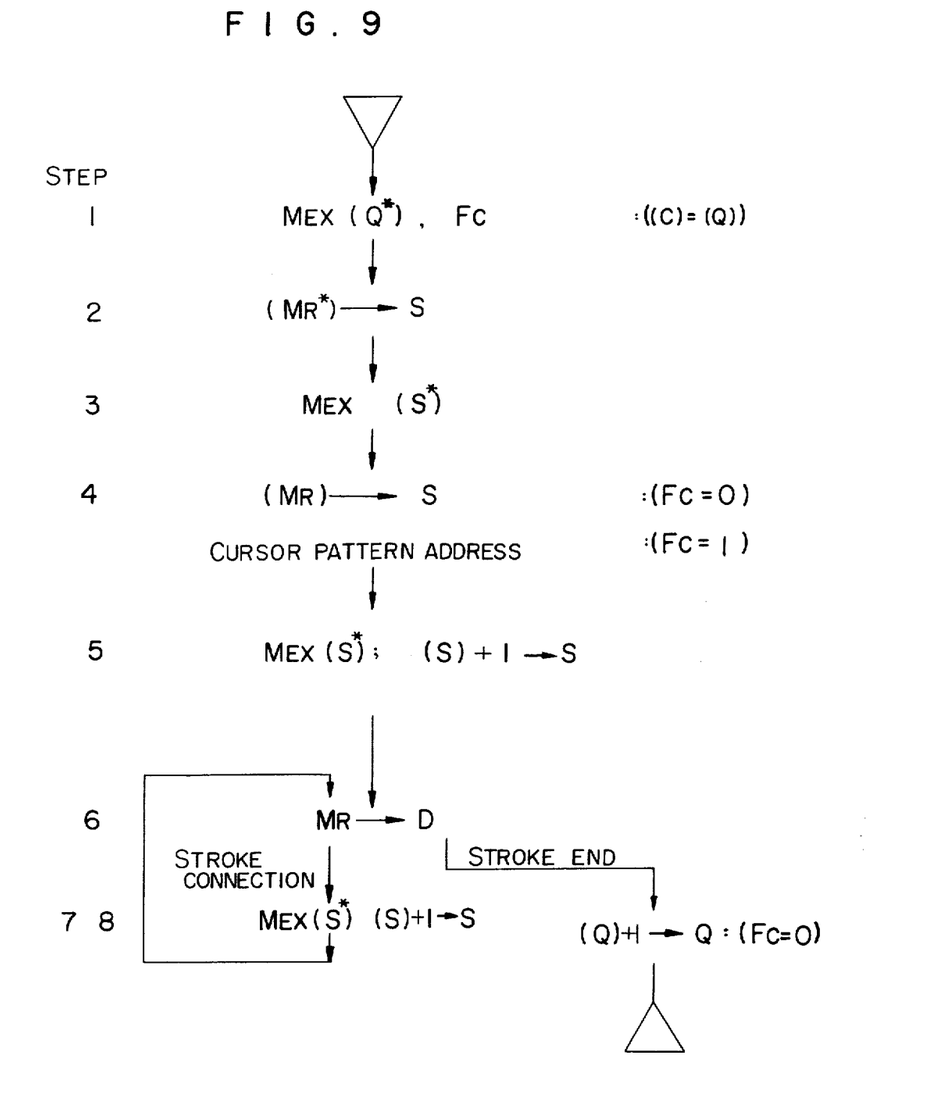
FIG. 9 is a microprogramming flow chart for CG sequence.

A microprogram flow chart for character generation is shown in FIG. 9. This is called a character generating (CG) sequence and on principle is executed alternately with the instruction sequence of the microprocessor. In a special case or during the fly back for CRT display, for example, only the instruction sequence is executed with the CG sequence damped. The CG sequence is inserted in the microprocessor at the end of an instruction as in the interruption. In this connection, it is necessary to provide the microprocessor with a means for receiving the CG sequence. The operation of each step will be explained below with reference to the microprogram flow chart and the block diagram.

Step 1: The memory is energized with the information stored in the character position counter Q as a memory address. Symbols Q and * in FIG. 9 denote a qualification for matching the value on counter Q with the refresh memory area of the microprocessor. In addition, the information stored in counters C and Q agree with other, the cursor flip-flop (FC) is triggered, i.e. the flip-flop is reversed.

Step 2: Character code information in the refresh memory which has been read by the memory register is properly modified and transferred to register S of the external device. At this time, the information stored in register S indicates the first address of the pattern data corresponding to a character involved.

Step 3: The memory is energized with the information stored in the register S as a memory address. As a result, the first address of the character pattern routine is obtained.

Step 4: In this step, two different operations are performed according to the value of the cursor flip-flop FC. In other words, when FC is zero, the first address of the character pattern which has been read by MR is transferred to register S. When FC is 1, on the other hand, (C) = (Q), and therefore the first address of the cursor pattern is registered in the register S.

Step 5: The memory is energized with the information stored in counter S as an address, while at the same time adding +1 on the register S.

Step 6: The stroke data read out is transferred to register D, the output of which is generated as a character through the stroke generator.

Step 7: When the stroke is not completed, the same operation as step 5 is performed and a return is made to step 6. When the stroke is completed, the CG sequence is left after adding +1 on counter Q except when FC = 0.

Among the above-described steps, a special reference must be made to the function of cursor indication. When the condition on which an indication is made on the cursor is met, that is, when (C) = (Q), it will be noted that the CG sequence is operating in a somewhat different manner. If the CG sequence is entered when such a condition is met, a cursor pattern is first indicated at the character position. As will be clear from step 7, on the other hand, +1 is not added on counter Q, which functions to indicate a character when the CG sequence is entered for the second time. This switching is effected by the cursor flip-flop FC.

There is considerable freedom for selection on how a microprogramming instruction is given to each step. Since different steps have different operations, it will be enough if codes are allotted to each step as desired. Steps 5 and 7 may appear to be identical with each other in their operations but different from each other in the manner in which a transfer is made to the next microprogramming instruction, and therefore there is no way but to classify them as different microprogramming instructions. As a result, the functions of this sequence are capable of being performed by providing eight microprogramming instructions.

It will be understood that the adaptors used with the CRT display unit are much fewer than when a computer is connected with a CRT display unit through the I/O channel. In other words, in the microprocessor according to the present invention, the external circuits are minimized. Especially, sequence information concerning control functions is given by the microprocessor, so that the adaptor has only to execute a designated program during a cycle involved. This enables a very simple construction of the microprocessor interface comprising only a decoder and a few timing circuits without any special sequence control for storing an internal condition.

As a second embodiment, a transmission control adaptor integral with the microprocessor and connected with a communications line will be explained. Because of this function, the microprocessor not only is capable of meeting a variety of requirements of terminal equipment or terminal processing device but has the advantage of the cost being as low as a single-purpose terminal control. The operation of the transmission control adaptor which is closely related to the program of the microprocessor should preferably be program-controlled. This is because it is necessary to closely relate the hardware with a program in advance since the operation of the adaptor as hardware always comes to be related to the program of the microprocessor. This is a situation similar to the case in which the system control is effected by an I/O instruction through a programmed I/O channel of the minicomputer, the only difference being that according to the method of connection in the present invention the microprocessor is more concerned with the control of the I/O devices and therefore the interface and other circuits become more economical.

Figure 10:
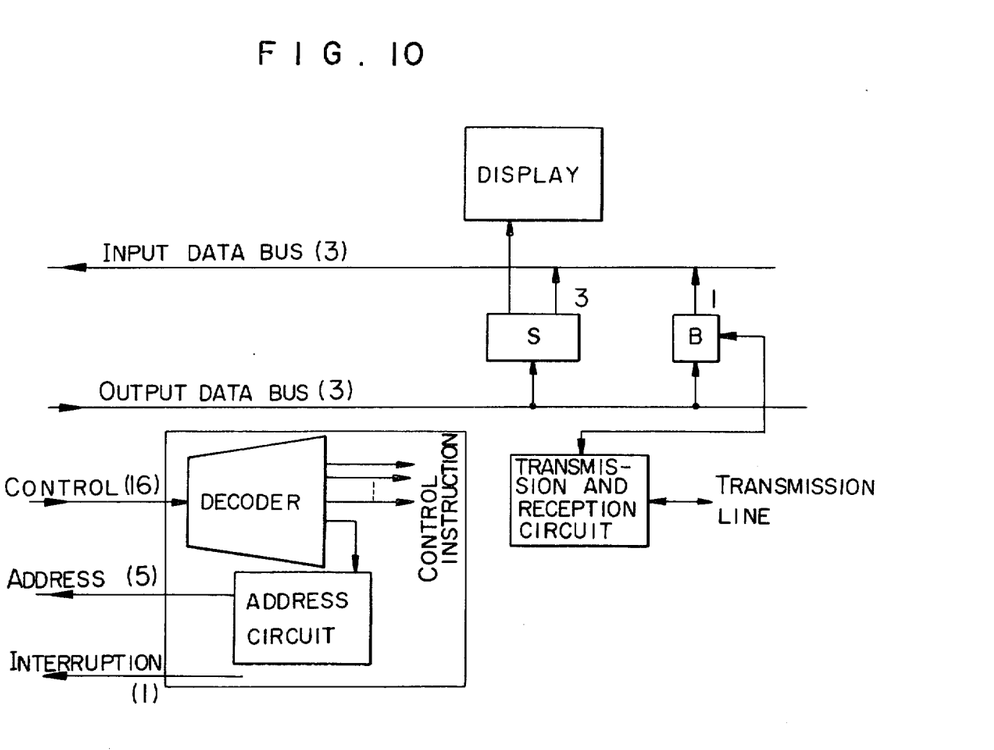
FIG. 10 is a block diagram showing the functions of transmission control adaptor.

A block diagram illustrating the functions of the transmission adaptor is shown in FIG. 10. The data bus for data flow holds 3 bits, of which only the lowest one is used for data communication with the transmission line. Following are the instruction words for controlling the adaptor:

1. Transmission and Reception Mode Switch

The transmission and reception mode of the adaptor is switched. That is to say, a transfer of mode from transmission to reception or from reception to transmission is ordered.

2. READ DATA (1 bit)

One bit of data from the adaptor is read into the lowest-order bit of register A.

3. WRITE DATA (1 bit)

One bit of data from the lowest-order bit of register A is delivered to the adaptor.

4. READ STATUS (3 bits)

A status of the adaptor or transmission control is read into the lowest 3 bits of register A.

5. WRITE STATUS (3 bits)

The lowest 3 bits of register A are written into the status register of the adaptor.

6. Completion of Character Communication

Completion of transmission and reception of a character of data is indicated.

The adaptor should preferably have such an interface function that an interruption is made in the microprocessor each time of transmission and reception of one bit.

The above-described instructions all indicate an operation almost as simple as a microprogramming instruction. In spite of this, the advantages derived from the control operation through a microprogram routine consist in the facts that great convenience is achieved in adding new instructions and that the microprocessor shares a considerable portion of the functions of the adaptor control. As a result, the microprocessor is more closely associated with the adaptor than when as in the case of an I/O instruction the reading of instructions and the control are left to an external device.

The transmission and reception section as shown in FIG. 10 acts as an agent to maintain the relationship between the 1-bit buffer register and the transmission line, and it does nothing but synchronization of the transmission and reception. The above-mentioned instruction on Completion of Character Communication is needed to instruct the transmission and reception section in the bit order to perform an operation of start-stop synchronization.

The status register S is concerned with the functions to make necessary indications as an adaptor and has the following modes of operation:
1. 2 bits: Indication of the reception mode, write mode, transmission mode and local mode.
2. 1 bit : Indication of an error at the time of reception.

The information stored in register S is changed not by hardware but by a program.

The processor interface is constructed in substantially the same way as the CRT display adaptor, except for an interruption function which is required of the former, whereby it is necessary to establish such a program so as to make an access to the data buffer each time of transmission and reception of a bit.

Figure 11:
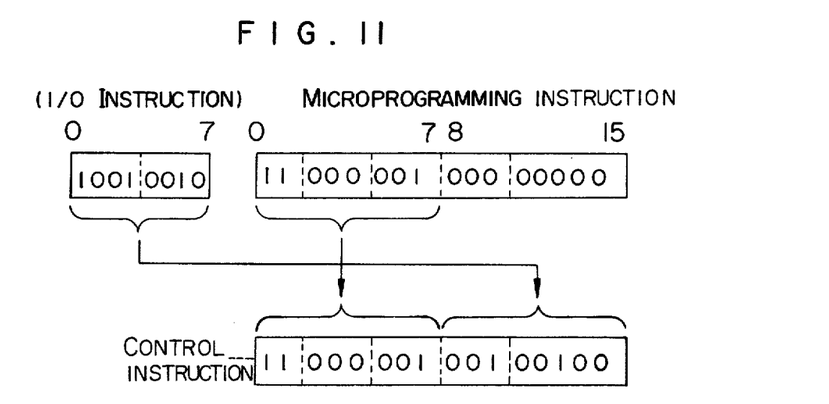
FIG. 11 is an instruction chart for control of an external device.

Also, it is necessary to provide the following-mentioned functions of a microprogramming instruction in order to relate it to an instruction for controlling the adaptor:

As a variation of the type 3 of a microprogramming instruction, the lowest-order 8 bits should be substituted on register F when all the lowest-5 bits of the operation codes for the external device are 00000. In this case, the substitution must be made in such a manner that the external device number of control information agrees with its format. In other words, the information stored in register F must replace the lowest-order 8 bits on the memory register ROMR with one bit shifted leftward. Provision of this variation makes it easy to relate the I/O instruction to a microprogramming instruction. As an example, the instruction READ DATA, a microprogramming instruction making up an execution cycle thereof and a control instruction to be delivered outside are shown in FIG. 11.

Bits 1 to 3 of the I/O instruction show the machine number of the external device which is 1 in the present case. Bits 4 to 7 show the operation code for the external device, code 2 showing READ DATA. Bits 0 and 1 of the microprogramming instruction show type 3, and the next 3 bits the operation within the microprocessor, code 0 indicating a transfer from input to output bus without any change. Code 1 of the next 3 bits indicates that register A is involved, so that bits 0 to 7 issue an instruction to set the data from the input bus in register A.

Bits 8 to 15 are all zero, indicating a variation of the type 3 of microprogramming instruction which is ultimately sent out to the external device. The I/O instruction and microprogramming instruction combine to make a control instruction for completion of the required information.

As can be seen from the above explanation, the I/O instruction and the microprogramming instruction can be matched with each other very easily. As microprogramming instructions for the adaptor, it is enough to prepare, in addition to the 6 digits directly connected with the I/O instruction, a microprogramming instruction to search an interruption machine number required for an interruption program. This additional microprogramming instruction functions in such a manner as to ask the external device "whether or not an interruption is made" and, if so, add +2 through the address bus.

I claim:
1. A program-controlled microprocessor of the microprogramming type for incorporation in a system having at least one external device for operating as a part of said microprocessor, said microprocessor having an arithmetic section including a plurality of data buses, a control section including a read-only-memory register, and interface means connecting said microprocessor to said at least one external device, said interface means comprising data bus means including at least predetermined ones of said plurality of data buses of said arithmetic section of said microprocessor, control bus means connecting said read-only-memory register with said at least one external device and for providing outputs from said read-only-memory register indicative of microprogramming instructions to said at least one external device, and address bus means connecting said control section of said microprocessor with said at least one external device, said address bus means being responsive to an output of said at least one external device for supplying the output to said control section of said microprocessor whereby the output of said at least one external device designates an address of the next microprogramming instruction to be executed, the output of said at least one external device being provided in response to a microprogramming instruction supplied through said control bus means to said at least one external device.

* * * * *